F. HUYKMAN.
BABY CARRIAGE SLEIGH.
APPLICATION FILED AUG. 5, 1918.

1,288,007. Patented Dec. 17, 1918.

Witness
B. Schmidt

Inventor
Fred Huykman

By Victor J. Evans
Attorney

THE NORRIS PETERS CO., PHOTO-LITHO., WASHINGTON, D. C.

UNITED STATES PATENT OFFICE.

FRED HUYKMAN, OF UNION, NEW JERSEY.

BABY-CARRIAGE SLEIGH.

1,288,007. Specification of Letters Patent. Patented Dec. 17, 1918.

Application filed August 5, 1918. Serial No. 248,414.

*To all whom it may concern:*

Be it known that I, FRED HUYKMAN, a subject of the Queen of Holland, residing at Union, in the county of Union and State of New Jersey, have invented new and useful Improvements in Baby-Carriage Sleighs, of which the following is a specification.

This invention relates to an attachment for baby carriages and the like and has for its object the provision of an inexpensive device by means of which sled runners may be quickly applied to the wheels of the carriage to permit the latter to be propelled over icy roadways.

Another object of the invention resides in the construction of detachable runners which, while being arranged to be applied to or removed from the wheels efficaciously, are further adapted to permit of their application to wheels of carriages in which the axles of the wheels of various types of carriages, may be respectively located at different distances apart.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1:
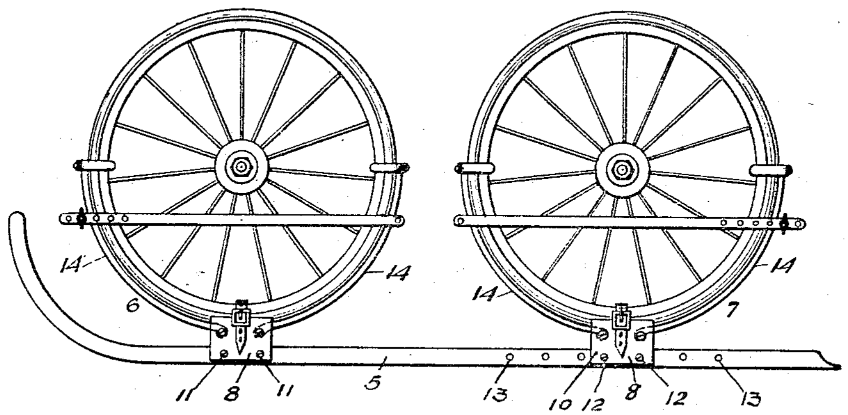
Figure 1 is a conventional side view of the supporting wheels of a carriage showing the application of the invention thereto.
Figure 3:
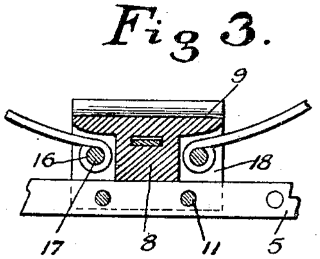
Fig. 3 is a vertical section therethrough with parts in elevation.
Figure 2:
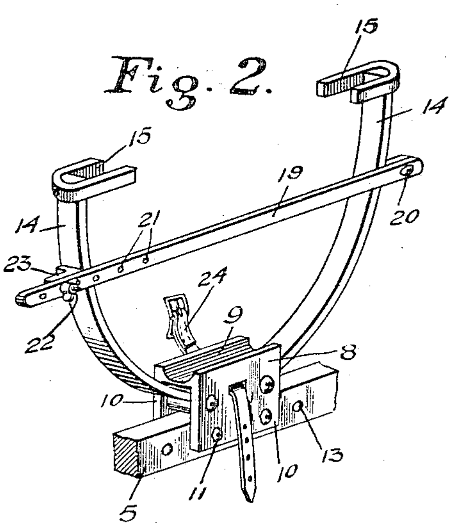
Fig. 2 is a perspective view of the wheel clamp and a portion of the runner.

In carrying the invention into practice, use is made of a set of runners such as the one illustrated at 5, in the accompanying drawing. This runner is adapted to underlie the wheels of the carriage and the same is provided with clamps 6 and 7, adapted to be associated with the wheels as clearly illustrated in Fig. 1. These clamps are substantially of identical construction and they are shown to consist of a base head 8 provided on its upper face with a wheel receiving groove 9, in which the base of the wheel is adapted to fit. Beneath the groove, the head is bifurcated at the sides 10—10 are arranged to straddle the runner 5. The front head 8, is preferably secured in a permanent manner to the runner by passing fastenings 11 through the flanges 10—10 and through the runner. The head 8 at the rear of the runner is slidable with relation to the fixed head 8, at the front of the runner and as illustrated, the flanges 10—10 receive fastenings 12—12 which are adapted to be passed through a corresponding number of openings 13. The mentioned openings are arranged in a longitudinal series so that a broad range of adjustment can be had to permit the heads 8—8 to accommodate themselves to various conditions.

Pivotally supported from each of said heads are clamping jaws 14—14, the upper ends of which are bifurcated as at 15, to accommodate the wheel therein. These jaws find pivotal connection beneath the grooves 9, of said heads 8 and it is preferred that their lower ends be looped as at 16 around bolts or pins 17, the latter being arranged in recesses 18 in said heads. The jaws are thus arranged to be adjusted relatively in order that they can be properly accommodated to wheels of different sizes.

In order to hold the jaws in the desired adjusted positions and in effective clamping engagement with the wheels, it is preferred to provide one of the jaws 14 of each head 8 with a locking bar 19, the same being pivotally mounted at 20 at one of its ends, while at its opposite end, the same is provided with a longitudinal row of openings 21 adapted to receive a clamping bolt 22, the latter being supported from a lug 23 which is fixedly mounted upon the opposite jaw 14. In this manner, the wheels are firmly grasped and clamped between the respective jaws. In order to prevent any upward movement of the wheels with relation to the jaws, I provide the heads 8 with clamping straps 24 which are adapted to be passed through the wheels to clamp against the rims thereof. The bases of the wheels are now held firmly seated in the receiving grooves 9, of said heads 8.

From the construction set forth, it is manifest that a set of such runners may be readily applied to or removed from the wheels of a carriage as the occasion necessitates. When not in use, the jaws 14—14 can be readily detached from the heads 8 if desired, and the entire structure arranged in a comparatively compact package for shipment or storage.

What is claimed as new is:—

1. An attachment for the wheels of carriages, comprising, a runner adapted to under-lie the wheels of the carriage, a fixed head on the runner, an adjustable head on the runner movable with relation to the fixed head, means for holding the second head against movement, a plurality of swinging clamps carried by each head and adapted to embrace a portion of the adjacent wheel of the carriage, said jaws having bifurcated portions adapted to straddle the wheel, and means for holding the jaws in clamped relation to the wheel.

2. An attachment for the wheels of carriages, comprising, a runner adapted to under-lie the wheels of the carriage, a fixed head on the runner, an adjustable head on the runner movable with relation to the fixed head, means for holding the second head against movement, a plurality of swinging clamps carried by each head and adapted to embrace a portion of the adjacent wheel of the carriage, said jaws having bifurcated portions adapted to straddle the wheel, means for holding the jaws in clamped relation to the wheel, said means comprising a swinging bar on one of said jaws, the said bar having a longitudinal series of openings therein, and means on the other jaw adapted for interchangeable connection in said openings.

3. An attachment for the wheels of carriages, comprising, a runner adapted to under-lie the wheels of the carriage, a fixed head on the runner. an adjustable head on the runner movable with relation to the fixed head, means for holding the second head against movement, a plurality of swinging clamps carried by each head and adapted to embrace a portion of the adjacent wheel of the carriage, said jaws having bifurcated portions adapted to straddle the wheel, means for holding the jaws in clamped relation to the wheel, the said heads having grooves therein adapted to receive the base portions of the wheels therein, and adjustable straps carried by the heads and adapted for engagement with the rims of the wheels to hold said wheels in fixed relation to the grooves.

In testimony whereof I affix my signature.

FRED HUYKMAN.

Copies of this patent may be obtained for five cents each, by addressing the "Commissioner of Patents, Washington, D. C."